Patented Feb. 11, 1947

2,415,400

UNITED STATES PATENT OFFICE 2,415,400

POLYMERIZATION OF MALEIC ANHYDRIDE AND METHALLYL ALKYL ETHERS

Robert T. Armstrong, Pompton Plains, N. J., assignor to United States Rubber Company, New York, N. Y., a corporation of New Jersey No Drawing. Application August 27, 1943, Serial No. 500,272

4 Claims. (Cl. 260—78)

This invention relates to improvements in copolymers, and more specifically to the copolymers of maleic anhydride and methylallyl ethers and their production.

2-methylallel alkyl ethers (hereinafter referred to as methallyl alkyl ethers) have the formula

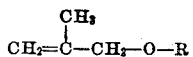

where R is an alkyl radical, normal or branched. Examples of such ethers are methallyl methyl ether, methallyl ethyl ether, methallyl heptyl ether, methallyl 2-ethyl-hexyl ether, methallyl isobutyl ether, methallyl amyl ether, methallyl n-octyl ether, methallyl n-propyl ether and methallyl iso-propyl ether, etc. Unlike vinyl alkyl ethers which readily polymerize alone, the methallyl alkyl ethers show practically no tendency to polymerize by themselves.

I have found that methallyl alkyl ethers will copolymerize with maleic anhydride to form high molecular weight thermoplastic copolymers which are believed to have the repeating structural unit indicated in the formula

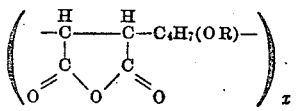

where R is an alkyl radical, normal or branched, and $x$ has a value of at least 6 and may be as high as 100 or even higher.

My methallyl alkyl ether-maleic anhydride copolymers are clear, water-white solid materials, readily soluble in acetone, ethyl acetate, chloroform, and aqueous alkali, and to a less extent in benzene, and insoluble in alcohol and ether. On heating, the polymers soften, can be pulled into threads, and are suitable for molding operations.

My methallyl alkyl ether-maleic anhydride copolymers may be reacted with any of the usual substances which are known to react with anhydrides of organic acids, such as water, alcohols, ammonia, amines, alkali hydroxides, etc. Due to their high molecular weight the rate of such reactions is usually somewhat less than the corresponding reaction with simple low molecular weight anhydrides. For example, a suspension of my methallyl ethyl ether-maleic anhydride copolymer in normal butanol dissolves on prolonged heating, and the polymer recovered is the half-butyl ester, a clear thermoplastic resin with valuable properties.

The preparation and properties of methallyl alkyl ether copolymers are illustrated below using methallyl ethyl ether as a typical example.

The copolymers may be prepared with or without solvent and preferably with a peroxide catalyst, e. g., benzoyl peroxide, acetone peroxide, zinc peroxide, tertiary butyl hydro peroxide, magnesium peroxide, etc., either in a sealed reaction vessel or under reflux, that is, at atmospheric pressure. Suitable solvents for the reaction are indicated in the examples below. The monomers react in approximately 1:1 ratio regardless of the initial proportions of monomers used. If either monomer is present in the reaction mixture in appreciable excess of a 1:1 molar ratio, the excess may be recovered nearly quantitatively. The X-ray diffraction pattern of a film of the copolymer shows a strong diffuse ring corresponding to a 3.1 Å spacing and a weak ring corresponding to a 6 Å spacing. This may indicate a regularity along the chain (probably 6 Å). The molecular weights, indicated as ranging from 2,000 to 13,500, are average values obtained by Staudinger's viscosity method.

Temperatures from room temperature to 150° C., or even 200° C., can be used for the reaction, depending upon the catalyst concentration and the time permitted for the reaction to proceed to completion.

In the following examples, given to illustrate the invention, the monomers maleic anhydride and methallyl ethyl ether, together with the catalyst, are placed in a tube, the air displaced with nitrogen and the tube sealed. After heating for the indicated time and temperature, the tubes are cooled, opened, and the polymer precipitated by pouring into diethyl ether. The finely divided polymer is then heated in a vacuum at a pressure of 1 mm. of mercury at a temperature of 100° C. for several hours, or in any case to constant weight. The softening range in each case indicates the temperatures at which the polymer just softens to such extent that threads may be drawn.

Methallyl ethyl ether may be prepared by well-known methods, such as by the reaction of sodium ethylate, in ethyl alcohol solution, with methallyl chloride. It is a colorless liquid with boiling point at atmospheric pressure of about 86° C.

EXAMPLE 1

Into a clean glass test-tube, 1.96 grams (0.02 mol) of maleic anhydride, 2.00 grams (0.02 mol) of methallyl ethyl ether, and 2.0 milligrams of benzoyl peroxide were placed, the air displaced with nitrogen and the tube sealed. It was then heated 16 hours at 60° C., after which the contents consisted of a colorless, clear solid with a few drops of liquid on top. The product was dissolved in 10 cubic centimeters of chloroform; this solution was poured into 50 cubic centimeters of diethyl ether which precipitated a voluminous powder.

After drying to constant weight in vacuo, 3.39 grams of product was found. This analyzed: C, 58.0%; H, 6.63%. Viscosity measurements on dilute solutions in chloroform gave a limiting viscosity $(\eta sp/c)o = 0.0150$, which corresponds to a molecular weight of 6500.

All molecular weights reported herein are those calculated by the method of Staudinger. They are based on the measurement of the viscosity of dilute solutions of the polymer. The limiting viscosity $(\eta sp/c)o$ is the specific viscosity divided by the concentration in grams per 100 grams of solvent and extrapolated to zero concentration.

EFFECT OF TEMPERATURE

The following table illustrates the effect of reaction temperature in my process. In the examples, 4.9 grams of maleic anhydride, 5.0 grams of ethyl ether, 0.05% (weight percent based on the maleic anhydride) of benzoyl peroxide, and 10 grams of chloroform were heated for 18 hours at the specified temperatures in sealed tubes under nitrogen.

Table I

| Example | Reaction temp., °C. | Per cent yield of polymer | Softening range, °C. | Average molecular weight |
|---|---|---|---|---|
| 2 | 50 | 88.2 | 120–175 | 10,500 |
| 3 | 100 | 92.4 | 120–170 | 9,100 |
| 4 | 125 | 86.2 | 120–150 | 5,400 |
| 5 | 150 | 93.7 | 120–150 | 5,400 |

These data show that the higher the temperature of reaction, the lower is the average molecular weight of the product.

EFFECT OF REACTION TIME

The examples in the following table illustrate the effect of time of reaction in my process. The reaction tubes were charged in the same mannner and with the same amounts of reactants as in the previous table except that the reaction temperature was 60° C. and the reaction time was varied as indicated.

Table II

| Example | Reaction time in hrs. | Per cent yield of polymer | Softening range, °C. | Average molecular weight |
|---|---|---|---|---|
| 6 | 2 | 12.4 | 130–175 | |
| 7 | 5 | 60.3 | 120–170 | 11,900 |
| 8 | 16 | 88.1 | 125–180 | 13,100 |
| 9 | 24 | 91.5 | 120–170 | 10,600 |
| 10 | 48 | 93.8 | 120–170 | 10,700 |

These data show that most of the reaction takes place within the first fifteen hours, at 60° C.

EFFECT OF VARIATION OF CATALYST CONCENTRATION

The following examples were run in the same manner as those in Table II except that the time of reaction in each case was 16 hours and the catalyst concentration was varied as indicated.

Table III

| Example | Benzoyl peroxide in weight, per cent | Per cent yield of polymer | Softening range, °C. | Average molecular weight |
|---|---|---|---|---|
| 11 | 0.01 | 67.8 | 120–170 | 10,500 |
| 12 | .1 | 100 | 120–170 | 10,400 |
| 13 | .5 | 99.5 | 115–165 | 7,600 |
| 14 | 1. | 100.2 | 115–150 | 6,000 |

These data show that the higher the catalyst concentration, the lower is the average molecular weight of the product.

EFFECT OF VARIATION OF CONCENTRATION OF REACTANTS

The following table illustrates the effect of varying the ratio of reaction monomers. In each case the indicated amounts of monomers were heated with 0.0025 g. of benzoyl peroxide in 5 cc. chloroform at 60° C. for 18 hours under a nitrogen atmosphere in a sealed tube.

Table IV

| Example | (a) Mols maleic anhydride | (b) Mols methallyl ethyl ether | a/b Ratio at start | Mols maleic anhydride recovered | Mols methallyl ethyl ether recovered | a/b Ratio in product | Per cent approx. yield based on recovery values | Softening range, °C. | Average molecular weight |
|---|---|---|---|---|---|---|---|---|---|
| 15 | 0.025 | 0.05 | 1:2 | 0.00041 | 0.027 | 1:1 | 94.4 | 120–165 | 5,600 |
| 16 | .05 | .025 | 2:1 | .022 | | 1:1 | 94.3 | 130–185 | 10,800 |

ANALYSIS

| Example | Found | | | Theoretical for 1:1 molal | | |
|---|---|---|---|---|---|---|
| | C | H | Ethoxyl | C | H | Ethoxyl |
| 15 | 59.8 | 7.14 | 21.7 | 60.6 | 7.07 | 22.7 |
| 16 | 58.8 | 7.27 | 20.5 | | | |

Examples 15 and 16 show by the proportion of monomers which reacted (0.025:0.023 and 0.028:0.025) that the product always contains the interpolymerized ingredients in approximately 1:1 molal ratio, regardless of whether one of them is initially present in excess in the reaction mixture. It is also evident that with the maleic anhydride in excess, a product of higher molecular weight is formed.

EFFECT OF SOLVENTS

The following Table V illustrates the effect of solvents in my process. Four and nine-tenths grams of maleic anhydride, 5.0 grams of methallyl ethyl ether, 0.05% (by weight, based on maleic anhydride) of benzoyl peroxide, and 40 cc. of the indicated solvent were heated on a steam plate under reflux for 18 hours.

Table V

| Example | Solvent | Per cent yield of polymer | Softening range in °C. | Average molecular weight |
|---|---|---|---|---|
| 17 | C. P. benzene | 66.3 | 110–150 | 6,200 |
| 18 | C. P. dioxane | 53.7 | 90–115 | 2,400 |
| 19 | Acetone | 42 | 90–120 | 4,300 |
| 20 | C. P. acetone | 81.3 | 115–160 | |
| 21 | C. P. chloroform | 65.2 | 115–150 | 8,800 |

These data show that a variety of solvents may be used for carrying out the reaction.

The following example illustrates the preparation of a copolymer of maleic anhydride and methallyl heptyl ether.

A mixture of 9.8 grams of maleic anhydride, 17.0 grams of methallyl heptyl ether, 27.0 grams of chloroform and 0.052 grams of benzoyl peroxide was heated in a sealed tube for 16 hours at 60° C. The reaction product, a clear viscous gum, was purified by repeatedly dissolving it in acetone and precipitating it with petroleum either to yield a tough resin. After drying in vacuum to remove the last traces of solvent, the product analyzed: Carbon: 67.5, 67.5, 67.2%; hydrogen: 9.31, 8.99, 8.99%. The calculated values for molar equivalents in the copolymer are: Carbon: 67.3% and hydrogen 8.95%. The product softens at 45° C. and melts at 185° C.

In addition to the simple copolymers of methallyl alkyl ethers described above, I also find that the copolymer of maleic anhydride with dimethallyl ether possesses advantages for certain purposes where insoluble, infusible products are desired. Of especial value are ternary polymers in which part of the methallyl alkyl ether is replaced by dimethallyl ether. An example of the latter type of product is as follows: A mixture of 9.8 grams of maleic anhydride, 9.0 grams of methallyl ethyl ether, 1.26 grams of dimethallyl ether, and 0.49 gram of benzoyl peroxide was sealed in a glass tube and heated 16 hours at 60° C. The product was a clear hard resin, insoluble in acetone, benzene, and gasoline.

The copolymer of maleic anhydride with dimethallyl ether is illustrated by the following example: Twelve and six tenths grams of dimethallyl ether, 19.6 grams of maleic anhydride and 0.08 gram of benzoyl peroxide were dissolved in 15 grams xylene. This was heated to 100° C. and a vigorous reaction took place in which a white insoluble polymer was precipitated. After washing with hot xylene, 17 grams of a white powder was obtained which was infusible and insoluble in acetone, alcohol, gasoline, benzene, and other common organic solvents.

The following examples illustrate the manner in which my methallyl alkyl ether-maleic anhydride copolymers may be reacted with agents reactive with anhydrides of organic acids.

*Aqueous sodium hydroxide.*—Ten grams of finely divided methallyl ethyl ether-maleic anhydride copolymer described above was vigorously stirred in 20 cubic centimeters of 10% sodium hydroxide solution in water at room temperature. After about 2 hours a clear viscous solution of the sodium salt of the acid polymer was obtained. Such a solution is valuable as an emulsifying agent.

*Aqueous ammonia.*—Ten grams of the copolymer were stirred in 50 c. c. of 28% aqueous ammonia with gentle warming for 5 hours. A clear viscous solution of the ammonium salt of the acid polymer was obtained.

*Ethylene glycol.*—Polyhydric alcohols react with the cyclic anhydride groups to form polyesters. Such reaction taking place between the linear molecules of my copolymers cross-link them and convert the product into the insoluble state. Ten grams of the copolymer were suspended in 10 c. c. of anhydrous ethyl ether containing 1.5 grams of ethylene glycol. The ether was evaporated in a current of dry air at room temperature and the resulting powder was molded under 3000 lbs. per sq. in. pressure at 120° C. for 1 hour. The hard clear resin resulting was insoluble in acetone, benzene, or gasoline.

Having thus described my invention, what I claim and desire to protect by Letters Patent is:

1. An interpolymerizate of maleic anhydride and a methallyl alkyl ether, in which the said reactants are combined in substantially equimolar amounts.

2. A copolymer of maleic anhydride and methallyl ethyl ether, in which the said reactants are combined in substantially equimolar amounts.

3. A water-soluble salt, capable of forming viscous aqueous solutions, obtained by treating a maleic anhydride-methallyl alkyl ether copolymer with aqueous alkali, said copolymers having combined therein substantially equimolar amounts of maleic anhydride and said ether.

4. A product of reaction of a maleic anhydride-methallyl alkyl ether copolymer with an alcohol, said copolymers having combined therein substantially equimolar amounts of maleic anhydride and said ether.

ROBERT T. ARMSTRONG.

REFERENCES CITED

The following references are of record in the file of this patent:

UNITED STATES PATENTS

| Number | Name | Date |
|---|---|---|
| 2,047,398 | Voss, et al. | July 14, 1936 |
| 2,241,421 | Price, et al. | May 13, 1941 |

OTHER REFERENCES

Tamele, et al., article in Ind. Eng. Chem., 33, 115–20 (1941).